United States Patent [19]
Thorn

[11] Patent Number: 5,267,747
[45] Date of Patent: Dec. 7, 1993

[54] ADAPTOR FOR A THREE POINT HITCH

[76] Inventor: Howard R. Thorn, 169 Liberty Hill Rd., Lexington, S.C. 29073

[21] Appl. No.: 911,271

[22] Filed: Jul. 9, 1992

[51] Int. Cl.$^5$ .......................................... A01B 59/043
[52] U.S. Cl. .................. 280/416.2; 280/503; 172/450
[58] Field of Search ............... 280/415.1, 416.1, 416.2, 280/455.1, 474, 470.1, 504, 506; 172/47, 439, 450, 776; 37/231

[56] References Cited

U.S. PATENT DOCUMENTS

| | | | |
|---|---|---|---|
| 2,321,516 | 6/1943 | Robertson | 280/33.44 |
| 2,341,807 | 2/1944 | Olmstead | 280/33.44 |
| 2,465,641 | 3/1949 | Gardner | 280/33.44 |
| 3,151,883 | 10/1964 | Stuart | 280/415 |
| 3,421,779 | 1/1969 | Shelby | 280/479 |
| 3,716,253 | 2/1973 | Gniffke et al. | 172/248 X |
| 3,843,160 | 10/1974 | Frushour et al. | 280/416.1 |
| 4,069,874 | 1/1978 | Buck et al. | 172/450 |
| 4,220,350 | 9/1980 | Hatcher | 280/460 |
| 4,484,759 | 11/1984 | Zwick | 280/416.1 X |

FOREIGN PATENT DOCUMENTS 1455494 11/1968 Fed. Rep. of Germany ... 280/416.2

*Primary Examiner*—Margaret A. Focarino
*Assistant Examiner*—Victor E. Johnson
*Attorney, Agent, or Firm*—Michael A. Mann

[57] ABSTRACT

An adapter for enabling a tractor having a three point hitch to pull an implement designed for connecting to a sleeve hitch. The adapter comprises a frame with two parts, one part attachable to a three point hitch and a second part having a hole for receiving a pin to connect the adapter to the bracket of an implement. Two bolts, one on either side of the hole for the connecting pin, can be turned to threadingly engage the bracket and thereby prevent rotation of the implement about the pin. The three points of the adapter to which the tractor attaches are two spaced apart, coaxial bars and a member with a throughhole in it, located above and between the two bars, all connected to the frame.

1 Claim, 2 Drawing Sheets

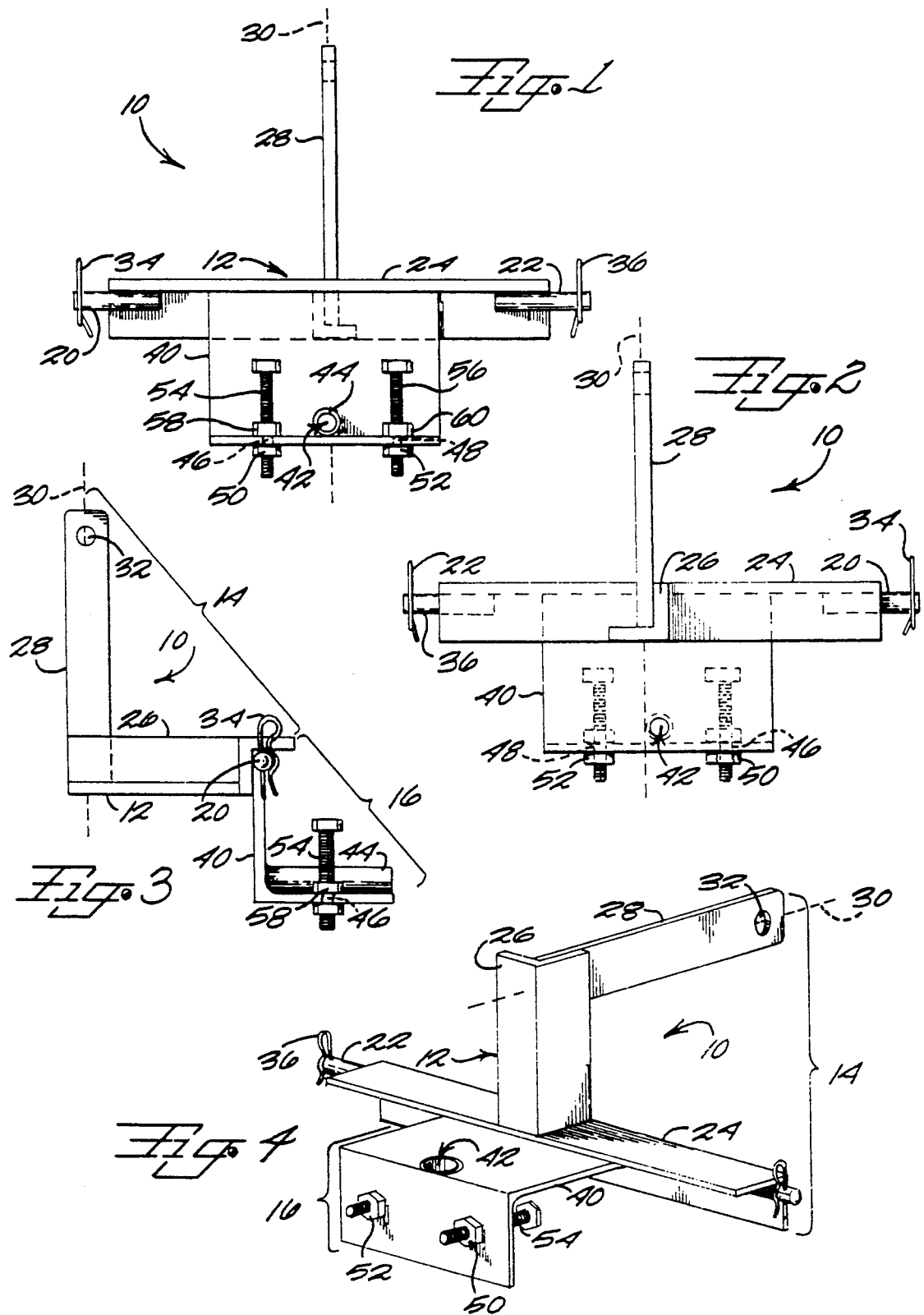

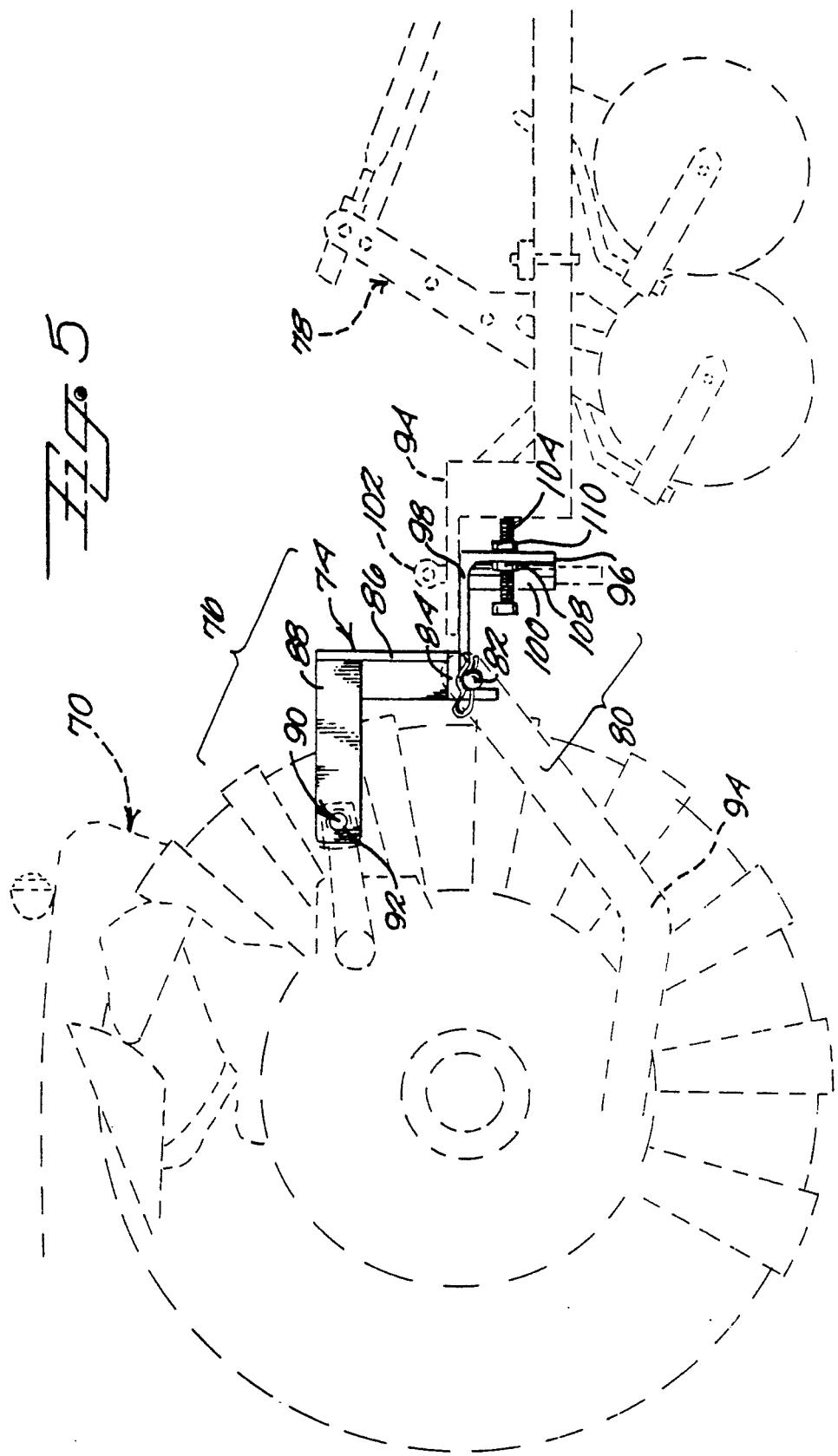

ADAPTOR FOR A THREE POINT HITCH

BACKGROUND OF THE INVENTION

1. Field of the Invention

The present invention relates to adaptors for use with tractors having three point hitches to enable them to pull implements that are designed for sleeve hitches.

2. Discussion of Background

There are several types of hitches to connect implements to tractors. Two types of hitches are three point hitches and sleeve hitches. Tractors come equipped with one type of hitch and can attach to and pull implements designed for that type of hitch easily. Without an adaptor, however, a tractor cannot properly pull an implement that is designed for a different type of hitch.

A three point hitch is a versatile, strong, and secure hitch. It controls horizontal and vertical movement of the implement being pulled and can be used to raise and lower the implement as desired. A sleeve hitch, however, is simpler, being simply a tongue with a hole in it. When the bracket of the implement, which also has a hole in it, is aligned with the tongue, a pin is put into the aligned holes to secure the implement to the tractor.

For individuals who own garden tractors with three point hitches, having a way to safely and securely pull implements designed for sleeve hitches would be very useful and economical and give them additional flexibility.

SUMMARY OF THE INVENTION

According to its major aspects and broadly stated, the present invention is a device for use in connecting an implement to a tractor having a three point hitch. An "implement" includes a plow, a trailer, a grass catcher and so forth, where the implement has a connecting bracket with a hole in it for receiving a pin. The bracket is attachable to the types of tractors that come equipped with a sleeve hitch, rather than a three point hitch, by aligning the hole of the bracket with a hole in the sleeve hitch and securing the bracket and the hitch by placing the pin in the aligned holes.

The device enables the implement to be pulled or drawn by the three point hitch type tractors and comprises a frame formed to attach to the tractor's three point hitch on one side and to the implement on the other side. The frame has two bars, spaced apart and coaxial, and a member held therebetween by the frame and having a major axis perpendicular to the axis of the bars. A hole in the member, combined with the bars, form the three points of a three point hitch.

Attached to the frame is a tube for receiving the pin of the implement to be pulled and two bolts threadedly positioned in two threaded holes in the frame. The bolts are spaced apart and to the sides of the tube so that, when the pin is in the hole of the bracket and received by the tube, the bolts can be turned until they engage the bracket on either side of the pin and help to prevent rotation of the implement about the pin. The engaged bolts, however, prevent such rotation and stabilize the implement laterally.

The two bolts are an important feature of the present invention. The two bolts provide a simple and completely adjustable but lockable way of stabilizing the implement. By turning the bolts, they can be brought into and out of engagement with the bracket. Once the bolts engage the bracket, locking nuts prevent the bolts from working loose.

Another feature of the present invention is the combination of the tube and the hole in the member since, by having the two in substantial alignment, that is, in the same plane, the implement is thereby aligned with the tractor.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a bottom view of a device according to a preferred embodiment of the present invention;

FIG. 2 is a top view of the device as shown in FIG. 1;

FIG. 3 is a side view of the device as shown in FIG. 1;

FIG. 4 is a perspective view of the device as shown in FIG. 1;

FIG. 5 is a side view of a device according to a preferred embodiment of the present invention attached to the three point hitch of a tractor and to an implement to be drawn by the tractor.

DETAILED DESCRIPTION OF A PREFERRED EMBODIMENT

Referring now to FIGS. 1-4, the present invention is an adaptor for use with a tractor having one kind of hitch, namely a three point hitch, to enable it to pull an implement having a different kind of hitch, namely a sleeve hitch. Implements means any non-self-propelled device such as carts, grass catchers, gang mowers, plows, harrows, rototillers, and ground levelers.

A device according to the present invention is shown in the figures and indicated generally by the reference numeral 10. Device 10 comprises a frame 12 with two major sections or parts: a first part 14 that attaches to a three point hitch and a second part 16 (best seen in FIGS. 3 and 4) that attaches to the bracket of an implement.

First part 14 of frame 12 includes a first bar 20 and a second bar 22 that are held in spaced relation by a first member 24 to which they may be attached, for example, by welding, or they may be formed integrally therewith. First bar 20 and second bar 22 are coaxial, meaning that the axis of first bar 20 is aligned with the axis of second bar 22. First part 14 further includes a second member 26 attached to first member 24 and a third member 28 attached to second member 24 and having a major axis 30 perpendicular with the axis of first and second bar 20, 22. Third member 28 has a throughhole 32 and second member 26 centers and elevates third member 28 with respect to first and second bars 20, 22, when device 10 is in its normal orientation.

Throughhole 32 and first and second bars 20, 22 form three "points" of a three point hitch for releasable attachment to a tractor of the type having a three point hitch. Cotter pins 34, 36 in small holes in first and second bars 20, 22 prevent tractor hitch from accidentally losing its attachment to device 10.

Second part 16 of frame 12 comprises in the main a plate 40 with a right angle bend. A first hole 42 is formed in plate 40 and a tube 44 is attached thereto for receiving a pin from an implement. A second and a third hole 46, 48 are also formed in plate to the sides of first hole 42 and tube 44. Second and third holes 46, 48 are threaded or, alternatively, threaded nuts 50, 52 can be welded to plate 40 as shown and a first bolt 54 and a second bolt 56 can be thread into threaded nuts 50, 52, respectively. A first and a second lock nut 58, 60, can be used to tighten first and second bolts 54, 56, respectively, to plate 40.

Bolts 56, 58 can be moved into and out of engagement with the bracket of an implement. Because the bracket is attached to second part 16 by aligning the hole in the bracket with tube 44 and securing bracket and frame 12 together with the pin, bracket can rotate about pin unless prevented. By moving first and second bolts 56, 58 into engagement with bracket, on either side of tube 44, rotation is prevented and the bracket and therefore the implement being pulled are stabilized.

Device 10 is preferably made of steel and first and second members 26, 28, in particular, may be made of angled steel for strength. As will be apparent, first and second bars 20, 22 may be opposing ends of the same bar running the length of first member 26 or replacing first member 26 if attached directly to second member 28.

In use, as illustrated in FIG. 5, a tractor 70 having a three point hitch attaches to adaptor 74 at its first part 76 and an implement 78 attaches to adaptor 74 at its second part 80. First part 76 comprises first and second bars 82 (one visible in FIG. 5), first member 84 to which first and second bars 82 are attached, second member 86 and third member 88. Third member 88 has a throughhole 90 that receives a pin 92 from tractor 70 as two arms 94 (one shown) engage first and second bars 82 and can lift adaptor 74 by lifting bars 82 so adaptor 74 pivots about pin 92. Pin 82 and arms 86 are the three points of three point hitch 72.

Second part 80 secures adaptor 74 to bracket 94 of implement 78. Second part comprises a plate 96 with a right angle bend and having a hole 98 in it and a tube 100 attached to plate 96 aligned with hole 98. When attaching implement 78 to adaptor 74, a pin 102 is placed through hole and tube 100 when a hole in bracket 94 is aligned with tube 100, pin 102 securing implement to adaptor 74.

To stabilize implement 78, two bolts 104 (one visible in FIG. 5) that pass through holes in plate 96 and are tightened in place with nuts 108, 110 when they engage bracket 94. One bolt 104 is on either side of tube 100 so that rotation about pin 102 in tube 100 is prevented.

It will be apparent to those skilled in the art that many changes and substitutions can be made to the preferred embodiment herein described without departing from the spirit and scope of the present invention as defined by the appended claims.

What is claimed is:

1. An adapter for use in connecting an implement to a tractor having a three point hitch, said implement having a connecting bracket carrying a pin, said adapter comprising:

a frame having two spaced apart, threaded holes and a first bar,
a second bar spaced apart from said first bar and coaxial therewith, and
a member positioned between and above said first and said second bars and between said first and second threaded holes of said frame, said member having a throughhole having an axis, said member lying in a plane substantially perpendicular to said first and second bars, said axis of said throughhole being parallel to said first and said second bars, said first and said second bars and said throughhole of said member engaging said three point hitch of said tractor;

a receiving means having a tube attached to said frame between said first bar and said second bar, said tube dimensioned for receiving said pin and having an axis, said axis of said tube being substantially in said plane so that said pin of said implement will be substantially aligned with said throughhole; and two threaded bolts, each threaded bolt threaded into one threaded hole of said two threaded holes until said threaded bolt engages said bracket when said pin of said bracket is received in said receiving means, said two threaded bolts preventing rotation of said implement about said pin.

* * * * *